Feb. 26, 1935.  H. A. SMITH  1,992,448
COVERED ELASTIC THREAD AND METHOD OF COVERING SUCH THREAD
Filed June 20, 1931

Inventor.
Harold A. Smith

Patented Feb. 26, 1935

1,992,448

UNITED STATES PATENT OFFICE 1,992,448

COVERED ELASTIC THREAD AND METHOD OF COVERING SUCH THREAD

Harold A. Smith, Needham, Mass., assignor to Frank W. Gorse Co., Needham Heights, Mass., a corporation of Massachusetts Application June 20, 1931, Serial No. 545,821

10 Claims. (Cl. 117—57)

This invention relates to the covering of rubber thread and particularly round rubber thread.

Elastic rubber thread usually has one or more covers of textile yarns spirally wrapped thereon. Usually the covers each contain a plurality of ends of yarn, the number of ends and the number of covers being so selected that they completely enclose and conceal from view the elastic rubber thread when it is in fully stretched condition as well as when it is at ease. Heretofore the rubber thread has been square in cross section. Rubber thread is now being extensively used which is circular or round, and is produced in small diameters or sizes that, until recently, could not be produced in a practicable manner in cut square thread. The round rubber thread is made from a rubber latex composition which is forced as a continuous stream through an orifice of suitable diameter and is coagulated into a continuous filament or thread. Round rubber thread is also made by extruding a plastic rubber composition through a suitable orifice. Round rubber thread, especially in the fine sizes with which this invention is particularly concerned, can not be covered satisfactorily by the methods employed in covering square rubber threads as the covers slip on or are displaced longitudinally of the round rubber thread and thereby expose bare sections of the thread.

I have developed a novel process for covering round rubber thread which consists in corrugating the rubber thread circumferentially, and specifically by winding an innermost cover having few ends as compared with the outer cover or covers in an open spiral manner so tightly about the rubber thread that the thread of the innermost cover becomes imbedded into the surface of the round rubber thread and thereby is locked to the rubber thread against slipping axially. The outer cover, which may comprise a plurality of parallel ends of yarn, is then wrapped spirally about the rubber thread between and upon the convolutions of the first cover, which hold the second cover-convolutions against slipping axially on the rubber thread. This process and the covered rubber thread so made constitute objects of the present invention.

The outer textile cover of a rubber thread ordinarily does not slip upon the inner cover on which it is wound, due to the frictional engagement with and the interlocking of the fibers of the two covers. Thus, by locking the innermost cover to the rubber thread, by imbedding the entire length of each convolution of the innermost cover into the rubber thread, the innermost cover is locked to the rubber thread against slipping thereon and, consequently, the outer cover also is held against slipping.

A further object of the invention is generally to improve the construction of covered elastic rubber threads and the methods of making them.

Figure 3:
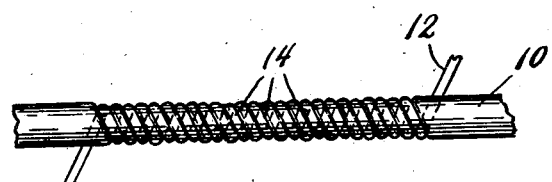
Fig. 3 is an enlarged elevation of the rubber thread of Fig. 1 with the inner cover applied thereto, the rubber thread being at ease.

The elastic rubber thread 10 with which this invention is concerned is round or circular in cross section as illustrated in Fig. 3, and has a smooth circumference and, as obtained commercially, is made by forcing rubber latex compositions in a continuous stream through a suitably fine orifice under conditions to cause the rubber to coagulate into a solid filament.

While the round rubber thread can be of any suitable size, or diameter, one of its chief advantages resides in the small diameter in which it is available. Fine round rubber thread can be more economically manufactured than a square thread of equivalent size. The present process particularly embraces the covering of fine round rubber thread.

In covering the rubber thread in accordance with the present invention, the thread is supported under suitable tension in the usual thread-covering machine and is advanced at a uniform rate in the direction of its length and passes through a covering position where the first cover is applied. The first cover comprises yarn of a degree of fineness that is proportioned to the degree of fineness of the rubber thread.

Figures 1, 4:
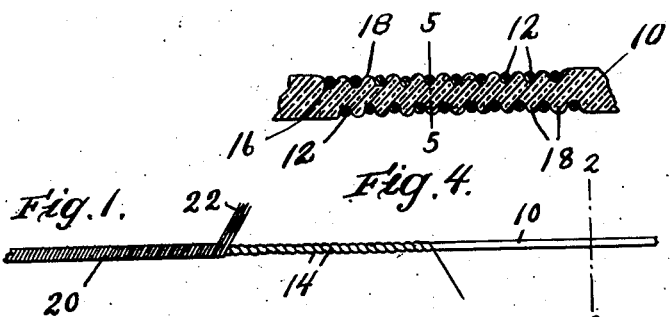
Fig. 1 is a side elevation of a covered rubber thread embodying the present invention and illustrating a bare section of the round rubber and adjacent sections with the first and second covers applied thereto in accordance with the present invention.
Fig. 4 is a longitudinal section through the rubber thread of Fig. 3.
Figure 5:
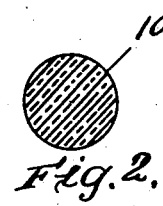
Fig. 5 is a section taken along line 5—5 of Fig. 4.
Figure 2:
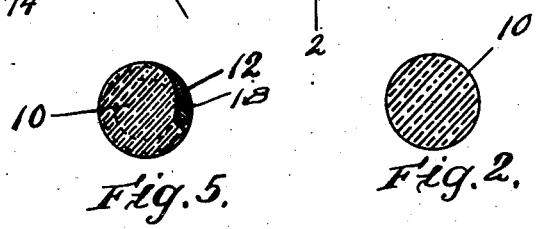
Fig. 2 is a section taken along lines 2—2 of Fig. 1.
Figure 7:
Fig. 7 is a view similar to Fig. 3 but illustrating an innermost cover consisting of two ends.

The first cover can comprise a single end of yarn 12, as illustrated in Fig. 3, or two ends 12, as illustrated in Fig. 7. It can also consist of more than two ends although, preferably, the number of ends is substantially less than the number of ends in the outer cover or covers. The cover thread is wrapped spirally about and upon the rubber thread in such manner that the cover thread forms a plurality of open or axially spaced convolutions 14 on the rubber thread, this spacing being determined by the rate of advance of the rubber thread and the rate of revolution of the flier which draws off the cover thread from a spool or bobbin of the cover thread and wraps it around the rubber thread. If the inner cover comprises more than one end, as two ends, the convolutions of the ends can be spaced apart or can be bunched together as in Fig. 7, so that rubber is visible between the spaced convolutions when the rubber thread is at ease. The covering process is modified over the usual process employed in covering square rubber thread in that the flier is weighted to such an extent that the cover thread 12 is under such increased tension that it is caused to imbed itself into the circumference of the rubber thread as is clearly shown in Fig. 3, thereby forming in the circumference of the rubber thread a continuous spiral groove or recess 16 in which the cover thread 12 is located and anchored against axial displacement, and convoluted continuous spiral ribs 18 in the rubber thread which lie between the convolutions of the cover thread. This has not been the practice in the covering of square rubber thread. For a round thread of given cross-sectional area, the flier weight is increased ten or more times the weight of a flier used with square rubber of equivalent cross-sectional area. Preferably the cover thread 12 is imbedded its full diameter into the surface of the rubber thread, when the rubber thread is at ease, that is to say, not extended although this degree of imbedding is not necessary in all instances, the requirement being that the cover thread 12 shall be sufficiently imbedded into the rubber thread so that it can not slip axially thereon when the rubber thread is stretched to its maximum intended length and also when the rubber thread is at ease. In Figs. 1, 3, 4 and 7, the rubber thread is shown at ease. Figs. 3, 4 and 7 are shown in greatly enlarged size. Thus the cover thread 12 will at all times be locked against slippage axially on the rubber thread and there will be corrugations or projections of the surface of the rubber thread which lie between the convolutions of the cover thread and hold the cover thread against slippage.

Figure 8:
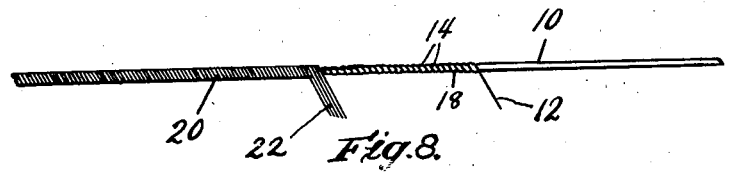
Fig. 8 is a view similar to Fig. 1 but illustrating the outer and inner covers as wound in the same directions on the rubber thread.
Figure 6:
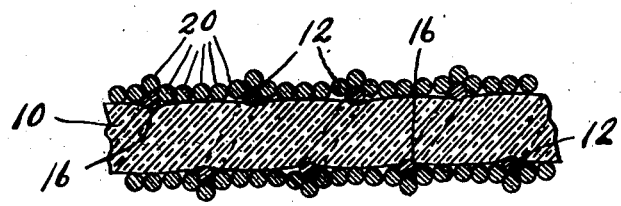
Fig. 6 is an enlarged longitudinal section of the completely covered rubber thread in a partially extended condition and illustrating the two textile covers and the manner in which the outer cover is locked against axial displacement on the elastic thread.

After the innermost cover thread 12 has been applied to the rubber thread in the manner above described, the outer cover 20 is applied to the rubber thread over the inner cover. The outer cover 20 consists of a plurality of parallel ends 22 of suitable size, there being preferably a sufficient number of ends so that the rubber thread is entirely covered and concealed when it is stretched to its intended limit of elongation. The outer cover 20 is wrapped upon the rubber thread and the inner cover thread adjacent the point where the innermost cover thread is applied and under a tension which is usual in the covering of square rubber thread and which is not great enough to cause the outer cover threads to bite into the rubber thread. Preferably, the outer cover is wrapped about the rubber thread and the first cover in the opposite direction to the winding of the innermost cover thread as illustrated in Fig. 1, and as is common in the art, although it can be wound in the same direction as the first cover, as shown in Fig. 8. The convolutions of the ends 22 of the outer cover are located upon the portions of the rubber thread that are exposed between the convolutions of the inner cover thread 12 and are also wound directly upon the inner cover thread. Since the frictional engagement of the two covers, and the interlocking of the fibres thereof, hold them against relative slipping in an axial direction, and since the inner cover is locked to the rubber thread against slipping thereon, it is apparent that both covers are held to the rubber thread against slipping. Fig. 6 illustrates, in an enlarged manner, the relative disposition of the covers on the rubber thread. When the outer cover is wound in the same direction as the inner cover, as illustrated in Fig. 8, at least some of the convolutions of the outer cover lie between and abut against consecutive convolutions of the inner cover, which latter convolutions serve as abutments that additionally hold the convolutions of the outer cover against slipping. Preferably, the pitch of the convolutions of the inner cover is about equal to or less than the pitch of the convolutions of the outer cover. In some circumstances, however, it is possible to have the pitch of the convolutions of the inner cover greater than the pitch of the convolutions of the outer cover but if the consecutive convolutions of the inner cover are disposed too far apart they will not hold the outer cover securely in position so that parts of the outer cover may slip axially and thereby expose portions of the bare rubber thread.

Figure 9:
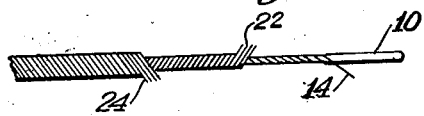
Fig. 9 is a view similar to Fig. 1 but illustrating the use of three covers on the rubber thread.

If, desired, a third cover 24, see Fig. 9, can be wrapped around the cover 20 in the usual manner and preferably will be wound in the opposite direction to the convolutions of the cover 20.

I claim:

1. The process of covering a round rubber thread of indefinite length so that the cover will not slip axially on the rubber thread, which process consists in wrapping a textile cover thread in axially spaced convolutions upon the entire length of the round rubber thread so tightly that the cover thread is embedded in a continuous manner into the entire circumferential extent of the rubber thread, at the time of covering and subsequently when the rubber thread is at ease and also when it is extended to its maximum intended length and continuous projecting convolutions are formed in the surface of the rubber thread which lie between the convolutions of the cover thread and hold them from slipping axially on the rubber thread.

2. The process of covering a round rubber thread of indefinite length so that the cover will not slip axially on the rubber thread, which process consists in wrapping a textile cover thread in axially spaced convolutions upon the entire length of the round rubber thread so tightly that the cover thread is imbedded in a continuous manner into the entire circumferential extent of the rubber thread, at the time of covering and subsequently when the rubber thread is at ease and also when it is extended to its maximum intended length and continuous projecting convolutions are formed in the surface of the rubber thread which lie between the convolutions of the cover thread and hold them from slipping axially on the rubber thread, and wrapping a second textile cover upon the rubber thread and the anchored first cover thread, whereby the second cover is held against slipping axially by the anchored first cover.

3. The process of covering a round rubber thread of indefinite length which consists in forming a series of projections on the surface of the thread which are spaced longitudinally thereon by winding a cover thread so tightly on the entire length of the rubber thread that the cover thread is imbedded in a continuous manner into the rubber thread, at the time of covering and subsequently when the latter is at ease and also when it is extended to its maximum intended length and wrapping a second cover thread on the rubber thread between and upon the first cover thread.

4. The process of covering a round rubber thread of indefinite length which consists in circumferentially corrugating the rubber thread by winding a cover thread so tightly thereon in uninterrupted spaced convolutions throughout the length of the rubber thread that the cover thread is imbedded in a continuous manner into the surface of the rubber thread at the time of covering and subsequently when the latter is at ease and also when it is extended to its maximum intended extent, and winding a second cover thread onto the rubber thread upon the corrugations thereof and between and upon the convolutions of the first cover thread.

5. The process of covering a round rubber thread of indefinite length which consists in winding a cover thread in an open spiral manner upon the rubber thread throughout the length thereof under such tension that the cover is imbedded in a continuous manner in the surface of the rubber thread at the time of covering and subsequently both when the rubber thread is extended to its maximum intended length and also when it is at ease, and winding a second cover onto the rubber thread between and upon the convolutions of the first cover and by which the second cover is held against displacement longitudinally of the rubber thread.

6. The process of covering a rubber thread of indefinite length which consists in winding cover threads upon the rubber thread under such different tensions so that some of the threads are free to slip along the rubber thread and one is imbedded continuously throughout its length in said rubber thread throughout the length of the latter at the time of covering and also subsequently and when the thread is extended its maximum intended amount and thereby is fixed against slipping and thereby holds the loose threads against slipping.

7. A covered round rubber thread comprising a round rubber thread of indefinite length having an outstanding open-spiral cover-holding rib of textile material that extends throughout the length of the rubber thread and is imbedded in a continuous manner into the rubber thread at all times and both when the rubber thread is at ease and also when it is extended its maximum intended amount, and a stranded textile cover wound upon the rubber thread between and upon the convolutions of the textile rib, the pitch of the convolutions of the rib being at least as small as the pitch of the convolutions of the cover and the diameters of the rib and the strands composing the cover being so small that a cover strand can lie between two proximate rib-convolutions.

8. A covered round rubber thread comprising a round rubber thread of indefinite length, a textile cover thread wound upon the round rubber thread with open-spiral convolutions and imbedded continuously throughout its length into the surface of the rubber thread throughout the length of the latter at all times and both when the rubber thread is in stretched condition and also when it is at ease, whereby the convolutions of the cover thread are anchored to the rubber thread at all times, and an outer textile cover comprising a plurality of ends of cover thread wound upon the rubber thread and between and upon the convolutions of the first cover thread.

9. A covered round rubber thread comprising a round rubber thread of indefinite length and a cover therefor comprising a plurality of cover threads wound spirally thereon and including a cover thread which is imbedded in a continuous manner into the surface of the rubber thread throughout the length of the rubber thread and is thereby held against displacement longitudinally of the rubber thread and is engaged by the convolutions of some of the other cover threads and holds them against longitudinal displacement, said cover thread being imbedded into the rubber thread at all times and both when the rubber thread is extended its maximum intended amount and when it is at ease.

10. A round covered rubber thread of indefinite length which has circumferential continuous spiral corrugations and interposed integral axially spaced spiral ribs, and a textile strand occupying the corrugations and anchored in place by said ribs, said ribs and strand being continuous throughout the length of said thread and providing an uneven surface to the round rubber thread which holds a superposed cover against slipping, said corrugations and ribs being present on the rubber thread at all times and both when the rubber thread is at ease and also when it is extended its maximum intended amount.

HAROLD A. SMITH.